United States Patent
Chen et al.

(10) Patent No.: US 6,193,504 B1
(45) Date of Patent: *Feb. 27, 2001

(54) PORTABLE ROTARY CATALYTIC OXIDIZER SYSTEMS

(75) Inventors: James M. Chen, Edison; James C. Fu, Plainsboro; Pascaline H. Nguyen, Holmdel; John J. Steger, Pittstown, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/050,323

(22) Filed: Mar. 30, 1998

Related U.S. Application Data

(63) Continuation-in-part of application No. 08/831,108, filed on Apr. 1, 1997, now Pat. No. 5,871,347.

(51) Int. Cl.[7] ........................................ F01N 3/10
(52) U.S. Cl. ........................ 432/72; 422/173; 422/175
(58) Field of Search ............................ 432/72; 110/210, 110/211, 212; 422/173, 175; 423/210; 165/7, 9

(56) References Cited

U.S. PATENT DOCUMENTS

| | | |
|---|---|---|
| 4,418,046 | 11/1983 | Izumo et al. ............... 423/245 |
| 4,678,643 | 7/1987 | Fetzere ...................... 422/175 |
| 4,834,962 * | 5/1989 | Ludwig ...................... 423/351 |
| 4,852,468 | 8/1989 | Harris ....................... 98/115.3 |
| 5,016,547 | 5/1991 | Thomason .................. 110/211 |
| 5,169,414 | 12/1992 | Panzica et al. .............. 55/60 |
| 5,336,128 | 8/1994 | Birdsong .................... 454/56 |
| 5,362,449 | 11/1994 | Hedenhag ................... 422/175 |
| 5,460,789 * | 10/1995 | Wilhelm ..................... 422/173 |
| 5,547,640 * | 8/1996 | Kim .......................... 422/177 |
| 5,562,442 | 10/1996 | Wilhelm ..................... 432/72 |
| 5,589,142 | 12/1996 | Gribbon ..................... 422/171 |
| 5,628,968 | 5/1997 | Hug et al. ................... 422/173 |
| 5,643,538 | 7/1997 | Morlee et al. ............... 422/173 |
| 5,871,347 * | 2/1999 | Chen et al. .................. 432/72 |

FOREIGN PATENT DOCUMENTS

| | | |
|---|---|---|
| WO 0 193 511 | 9/1986 | (EP) . |
| 0 684 427 A1 | 11/1995 | (EP) ................. F23G/7/06 |
| WO 94/23246 | 10/1994 | (WO) . |
| 95 01692 | 7/1995 | (WO) . |
| WO 96/20039 | 7/1996 | (WO) . |

OTHER PUBLICATIONS

*Girocat Sales Brochure, G E C Alsthom, Air Industrie Systemes.
*rotosolv, rotocat Sales Brochure.
Abstract of Japanese Patent, Publication No. 61157332, Publication Date: Jul. 17, 1986.

* cited by examiner

Primary Examiner—William Doerrler
(74) Attorney, Agent, or Firm—Stephen I. Miller

(57) ABSTRACT

A rotary regenerative catalytic oxidizer is disclosed which is a portable, compact system that catalytically destroys VOC and odorous compounds at elevated temperatures of 400 to 800° F. Equipped with a very high thermally efficient rotor of 90+%, most heat for reaction is retained in the apparatus, and the cleaned air at temperatures of 80 to 120 F. is safely discharged into room without causing discomfort. As a portable unit, it can be conveniently used to treat local areas where odorous and/or hazardous VOC and CO compounds are present and conveniently run off household 120V or 220V systems.

12 Claims, 9 Drawing Sheets

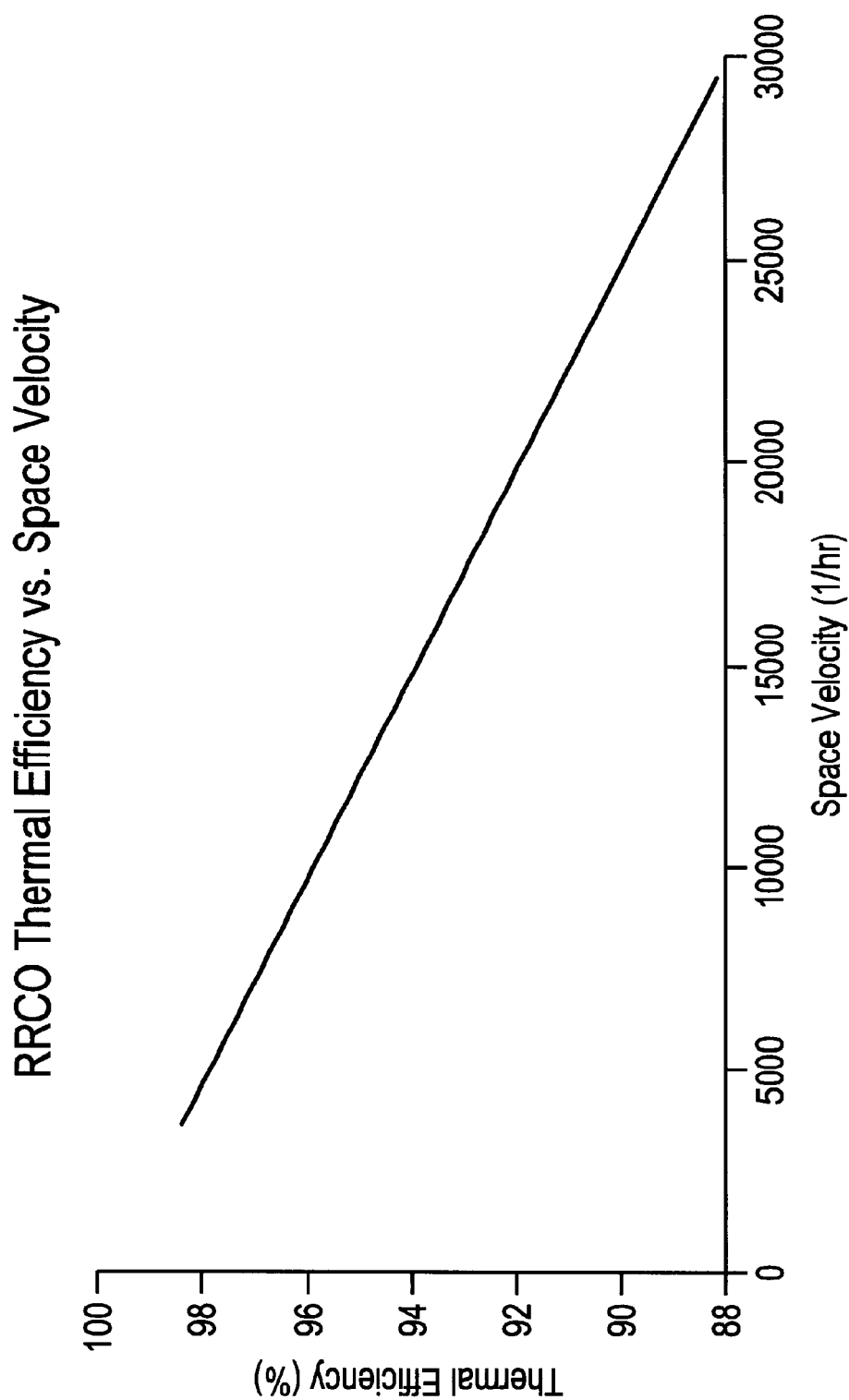

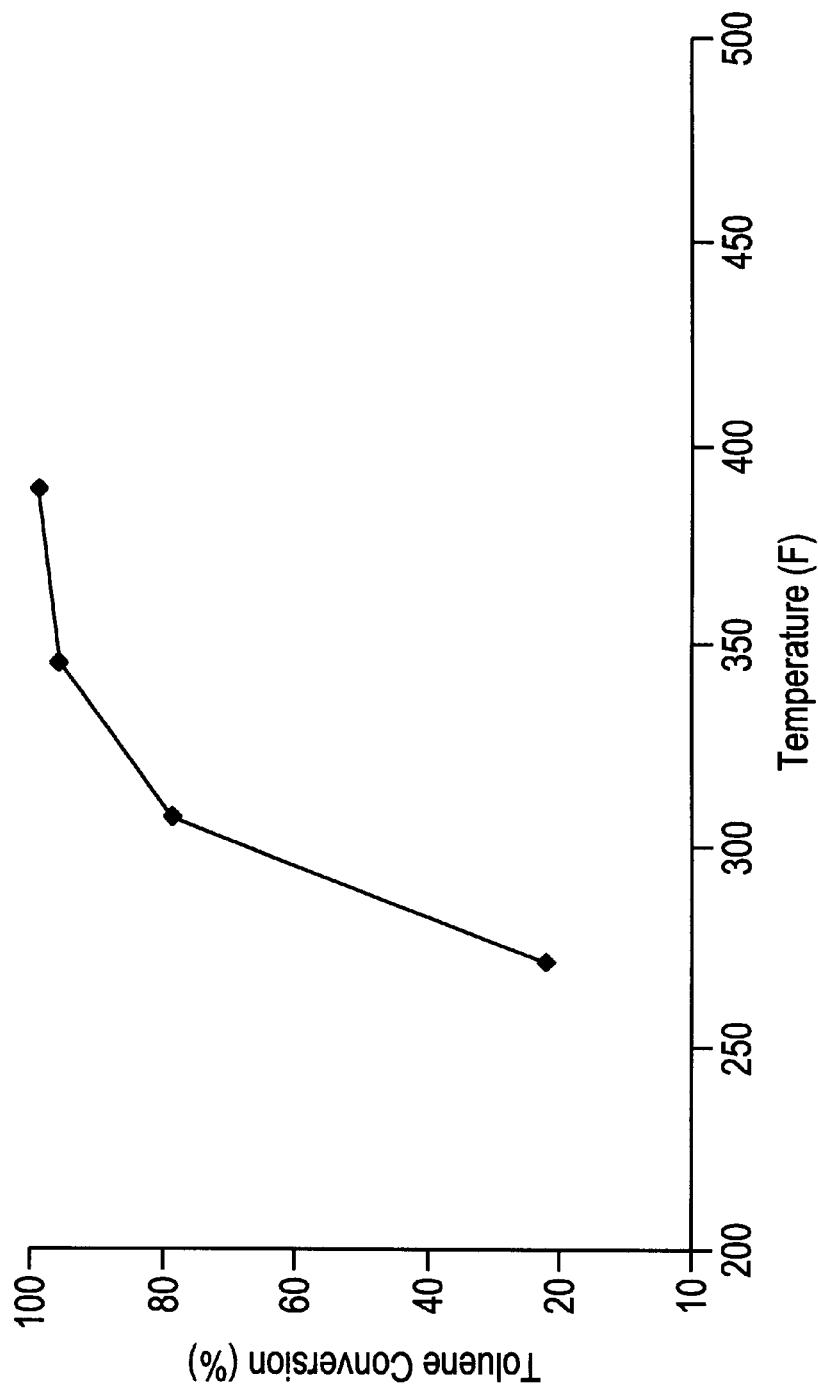

US 6,193,504 B1

PORTABLE ROTARY CATALYTIC OXIDIZER SYSTEMS

RELATED APPLICATION

This is a continuation-in-part application of U.S. Ser. No. 08/831,108 filed Apr. 1, 1997, now U.S. Pat. No. 5,871,347 and which is herein incorporated by reference.

BACKGROUND OF THE INVENTION

1. Field of the Invention

This invention relates to an apparatus and method for abating volatile organic compounds (VOCs). The uniqueness of the invention is that it is portable and is operable from household electrical power. In particular, this invention is concerned with a highly efficient regenerative catalytic oxidizer which in a preferred embodiment is only partially coated with catalyst.

2. Related Art

Treatment of localized air (i.e., indoor air or air surrounding an outdoor source of noxious compounds) is receiving attention in order to reduce human exposure to odor and toxic compounds. Air toxic compounds, such as CO, ozone, and VOC, can be present indoors either from transporting of poor outdoor air quality or from indoor sources, such as furnaces, insulation, furniture, paints, etc. In manufacturing facilities, poor indoor air quality can also result from plant operations and recirculating air systems. In residential buildings, excess high CO levels have been found from incomplete combustion in furnaces, and from transport through electrical conduits of high CO that is generated from short circuited outdoor electrical cables. In outdoor applications, leaks from valves or equipment relating to processes carrying noxious compounds are important to be treated in order that repair of the leaks are not hampered.

Currently, there are limited devices commercially available for treating localized air. None of these devices, however, are portable for treating local areas. Adsorbents such as carbon cartridges may be used to trap odorous compounds. However, these cartridges can adsorb limited types of VOC compounds and need to be replaced periodically. Catalytic devices are also used for removing these compounds. However, because catalyst activities are in general too low at ambient temperature for VOC oxidation, most applications will require to heat the catalyst to higher temperatures to facilitate air cleanup. The resulting treated gas temperatures are often too high for the air to be released directly into a room or other localized environment and may require a stack or directing means to discard the hot air. With this constraint, most catalyst devices are not portable and typically are mounted in larger and non-portable air recirculation systems. Catalyzing heat transfer surfaces that have significant air movement to clean up room air has also been mentioned. This approach is not very effective for two reasons: 1): the surface temperature is relative low and catalyst is only effective to treat limited VOC compounds, 2) the device is not portable. With these inherent constraints, there are yet commercial devices that have been accepted to be very effective for localized air treatment.

A practical device for localized air treatment will require the device to be capable of abating most odorous and toxic gas compounds. The device also needs to be portable so that it can be easily moved to treat problem areas. For example, to abate odors from freshly painted areas, the device can be moved to treat that area only. For persons working in odorous or high pollutant-containing areas, the device can be used to remove unpleasant odors around the neighborhood of individuals without the need of treating the whole room air. For furnaces that leak CO or other VOC species, the device can be located in that local area to quickly destroy these compounds. For meeting these needs, the device needs to be lightweight, and provide air circulation with the treated air being discharged into the room or localized area to displace untreated air. In doing so, the temperature of the treated air needs to be controlled in a comfortable temperature range (e.g. less than 120 F.) so as not to substantially increase the ambient temperature.

U.S. Pat. No. 4,852,468 discloses a ventilated work station for removing toxic fumes generated during sculpting of fingernails. However, this apparatus does not treat (destroy) the toxic fumes and only draws the fumes away from the work station.

U.S. Pat. No. 5,366,128 discloses a portable apparatus for removing fumes and vapors from the work area of a nail technician. However, as with U.S. Pat. No. 4,852,468, the disclosed apparatus only draws the fumes away from an area and does not destroy the fumes.

U.S. Pat. No. 5,547,640 discloses a high temperature air purifier for incinerating volatile organic contaminants and airborne particulates. An optional oxidation catalyst may be placed on the cup wall and the walls of the air passages near the hot end to speed up initial warm-up and combustion at lower temperatures, but it is stated that pure thermal oxidation is fast enough at temperature above 1600 degree F. Such a device, however, would not meet the strict design criteria of the present invention in having a portable, highly thermal efficient pollutant abatement device.

Applicants provide an advance over the prior art in providing a portable and highly thermal efficient rotary regenerative catalytic oxidizer for abating indoor pollutants or pollutants localized to a specific area (e.g., fugitive emissions whether indoors or outdoors). The advantages of which are herein below described.

SUMMARY OF THE INVENTION

The present invention provides a portable pollutant abatement apparatus for removal of indoor pollutants or localized pollutants such as volatile organic compounds (VOCs).

One embodiment of the invention provides a portable pollutant abatement apparatus for removal of pollutants and odorous compounds such as volatile organic compounds from ambient air present in a localized environment comprising:

an inlet for receiving the ambient air and directing the air to a fully or partially catalyzed rotary, heat regenerative device;

the rotary device comprising electrical heating means and means to recover heat from the air after catalytic oxidation and before the oxidized air is returned to the ambient air; and an outlet for directing the oxidized air from the rotary device to the ambient air.

In another embodiment, we have quite unexpectedly found that in order to achieve the highest VOC destruction efficiency, surfaces that are only partially coated with a catalyst composition have a higher VOC destruction efficiency than surfaces that have been fully coated with catalyst.

The method of the present invention provides directing the air to be treated to the rotary regenerative oxidizer, for heating and catalytic oxidation therein. The air stream then flows through a transfer chamber which oxidizes the pollutants in the stream and thereafter flows through an output portion of the rotary oxidizer and vented.

Another embodiment also operates in steady state and comprises a stationary fully or partially catalyzed heat regenerative bed, and, a one-piece rotary element that continuously rotates the air flow entering and exiting the bed, thereby alternating the various gas flows through the system.

If desired, the present invention may accommodate a purge stream which redirects cleansed exhaust air or other air back through the regenerative bed, thereby removing trapped contaminants.

An advantage for achieving high thermal efficiency is that the cleaned stream can be readily discharged without the need of a stack, thereby making the device portable and compact for handling small streams.

As used herein, the term air is intended to include both the ambient "outside" air and the ambient "inside" air of enclosed structures such as buildings. Therefore, the present invention contemplates treating indoor air, wherein the treated air exiting from the rotary device of the present invention is exhausted or vented to the air ("indoor") of the building. In application to "outside" air treatment, the present invention is ideally suited for treating so called fugitive emissions that may be localized to the extent the emissions have been emanating, for example, from a leaky valve or piping connection whether outside or inside of a building.

BRIEF DESCRIPTION OF THE DRAWINGS

FIG. 11 shows the effect of wheel (rotor) volume with respect to thermal efficiency.

FIG. 12 shows the effect of a catalyzed honeycombed wheel on the oxidation temperature of toluene.

Although the embodiments may be illustrated in certain spatial orientations, one skilled in the art will readily appreciate that the rotary oxidizers of the present invention may be horizontally, vertically, or otherwise orientated and that the air to be treated can pass through the rotary oxidizer perpendicularly or axially relative to the axis of rotation of the rotary oxidizer.

DETAILED DESCRIPTION OF THE PREFERRED EMBODIMENT(S)

This invention applies the concept of a rotary regenerative catalytic oxidizer ("RRCO") for control of pollutants or odors in a localized indoor or outdoor air environment. This new design uses a round metal or ceramic honeycombed rotor (wheel) which is fully or partially coated with a catalyst capable of oxidizing pollutants in the air.

The device is a rotary heat regenerative catalytic oxidizer. It consists of a rotor that has a honeycomb structure composed of discrete parallel channels. At least a portion of the rotor is coated with catalyst to promote oxidation reactions. The rotor is divided into two sections, with the untreated air entering from one compartment and exiting through the other compartment. Relative to the incoming air, the rotor is rotated at a frequency of 2 to 20 rpm. By installing an heat source at the other end of the rotor to regulate the rotor temperature of 400° F. to 800° F., many types of VOC and odorous compounds are destroyed via oxidation reactions. This catalyzed rotor provides both high VOC destruction and heat recovery. At a thermal efficiency of 95 percent, air entering at 70° F. and oxidized at 600° F. exits the apparatus at a temperature of about 95° F. With the flow of less than 200 SCFM, the heat source can be powered with house current to achieve the desired operating temperature.

Figure 1:
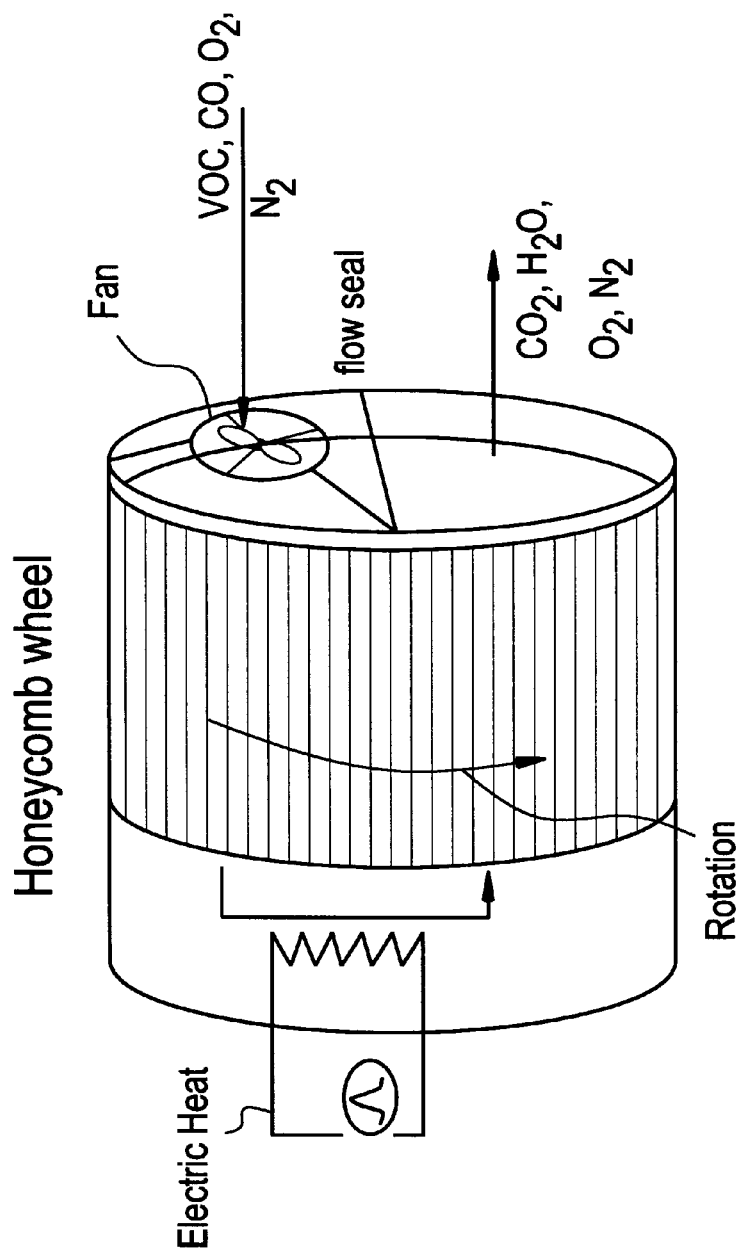
FIG. 1 schematically illustrates the apparatus of the present invention.

Catalytic oxidation converts volatile organic compounds (VOC) to $CO_2$ and water. Unlike adsorbents, catalysts can be used for long service periods without frequent adsorbent replacement. These features make catalytic oxidation more desirable than adsorption to treat indoor air. Unfortunately, very few catalysts are effective at room temperature to remove a variety of VOC or CO compounds. To be effective, catalyst temperature has to be increased. At 500° F. or higher temperature, many catalysts (e.g., Pt, Mn, Cu, etc.) have been shown to oxidize most odorous and toxic compounds. For example, at 500° F., a Pt catalyst can oxidize numerous compounds, such as aromatics, aldehydes, alcohols, ketones, CO, amines, ammonia, reduced sulfur compounds. Thus, to be an effective indoor treatment device, high catalyst temperature will be needed. However, since the treated air can not be safely or comfortably discharged back to the room at these elevated temperatures, the temperature of the treated air has to be cooled down substantially closer to the room temperature. Thus, the system is needed to incorporate a very effective heat exchange device. For example, to cool the treated air from 500° F. to 120° F., a thermal efficiency of at least 85 percent will be needed when treating air at 70° F. As will become apparent by the comparative examples provided herein, a partial catalytically coated rotary oxidizer unexpectedly provides the higher VOC destruction efficiency than fully-coated oxidizers. A rotary regenerator system combines high heat exchange efficiency and high catalytic temperature to achieve the desired performance. As shown in FIG. 1, the untreated air is heated by a honeycomb wheel substrate as it enters the rotary regenerator. As it approaches the hot side where the substrates is coated with catalysts, the VOC and odorous compounds in the untreated air is being oxidized. The heat of the cleaned air is transferred to the substrate before exiting into the room air. With a overall space velocity (SV) of 10,000 1/hr and using honeycombs with cell densities of 200 cells per square inch (CPSI), the thermal recovery will be greater than 92 percent with the wheel is rotated at the speed of greater than 2 rpm.

To process 50 scfm flow of air containing 200 ppm of CO at 500° F. with the apparatus operating at 90 percent thermal efficiency, the electrical requirement is only 700 watts and the cleaned air temperature discharged into the room is 115° F. With the wheel size of 1' diameter×5" long, the system is portable and can be powered by regular house current. Thus a device is estimated to weigh only 15 pounds and thus may be easily hand-carried by most individuals.

Figure 2:
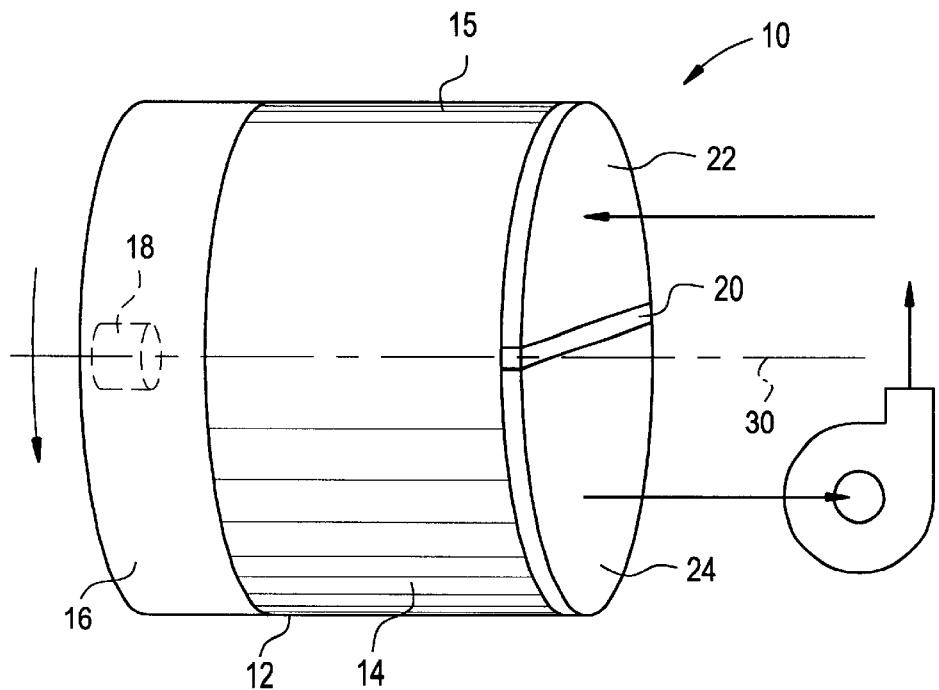
FIG. 2 schematically illustrates a first embodiment of the rotary regenerative catalytic oxidizer ("RRCO"), having a rotatable heat regenerative bed.
Figure 3:
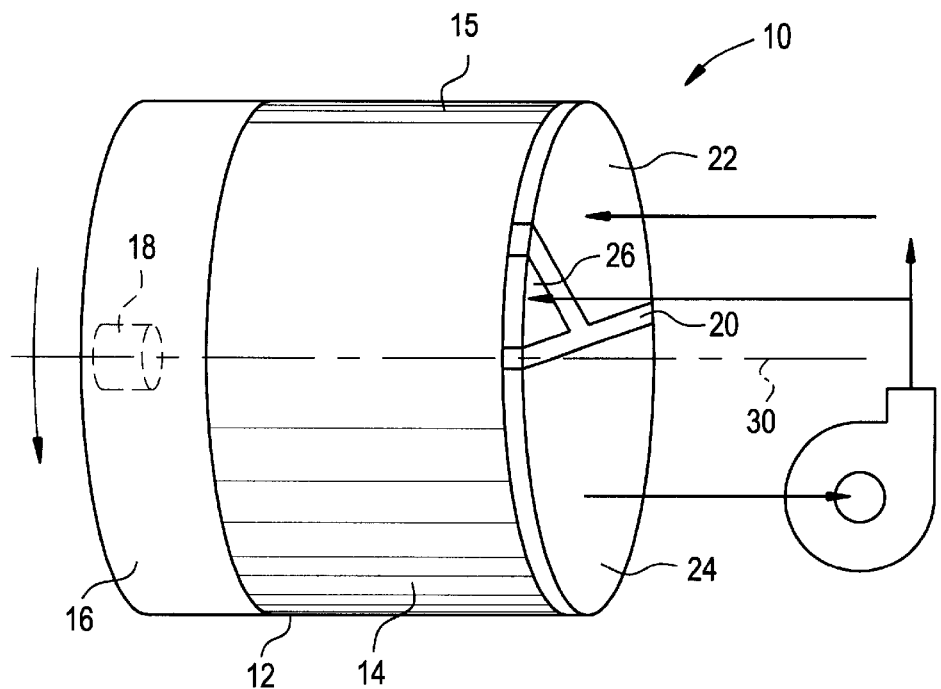
FIG. 3 schematically illustrates a first embodiment of the rotary regenerative catalytic oxidizer having a purge stream.

In accordance with a preferred embodiment of the present invention the apparatus uses a rotary regenerative catalytic oxidizer 10 (hereinafter "RCO"), as shown in FIG. 2 and contains a cylindrical housing 12. A cylindrical catalytic heat regenerative rotor 14 is disposed within housing 12. A transfer chamber 16 is sealed and connected to housing 12 at a second end of rotor 14. A heater device 18 is disposed within chamber 16. The heater device 18 may comprise an electric heater, electrically powered igniter or other electrically powered heat generating means and may be utilized either externally or internally of chamber 16. A first sealing endplate 20 is stationary and adjoins a first end of the rotor 14, thereby dividing the rotor 14 into an inlet compartment 22 and an outlet compartment 24. As seen in FIG. 3, endplate 20 may be modified in accordance with a second embodiment of the present invention to further include a purge compartment 26 within the rotor 14. Endplate 20 may be sealed to the rotor 14 either physically, pneumatically, hydraulically, or by any other method known in the art. A longitudinal axis 30 is centrally disposed within RCO 10, about which the rotor 14 rotates.

Rotor 14 is preferably constructed from a plurality of discrete and axially parallel, longitudinally disposed surfaces forming channels 15, each having a first and a second end. Each channel is constructed from heat exchange media such as ceramic, cordierite for example, or metal, stainless steel for example. Other metals that may be used include aluminum, carbon steel, and stainless steel. The preferred design is not limited to any geometric shape, and round, square, hexagonal, or other cross-sectional configurations may be utilized. More importantly, the heat exchange channels 15 form a monolith that is free from independent internal partitions that divide the heat exchange area into different flow regimes.

According to the present invention, the axially parallel heat exchange surfaces are fully or partially coated with oxidation catalysts, for example, such as $Pt/TiO_2$, Pt/alumina, manganese, chromium oxide, or combinations thereof. Suitable catalysts may vary according to the particular VOC or pollutants to be treated.

When using partially coated substrates, the amount of substrate left blank will depend on the oxidation temperature and type of VOC or pollutant to be destroyed. For example, at an oxidation temperature of 600° F., one half of the heat regenerative rotor would be at a temperature of 300° F. or higher. In this instance, it would be advantageous to coat the rotor to the extent the catalyst is effective for VOC or other pollutant destruction. Thus, the rotor may be more than or less than half catalyzed depending on the anticipated VOC or odorous compound to be destroyed.

In accordance with the present invention, longitudinally disposed channels reduce pressure fluctuations, and, due to impermeable walls, prevent the exchange of gases in the adjacent channels and eliminate the need for a separate sealing means between the ingoing and outgoing process gases. The heat exchange media should have a cell density ranging from at least 25 CPSI, but more preferably 64 CPSI, to 1000 CPSI or higher, to have sufficient area to enhance both heat and mass transfer and reduce the size of the rotor 14. However, one of ordinary skill in the art will readily appreciate that such a design factor should not be construed as limiting the scope of the present invention.

In operation and during rotation of the RCO, air enters through inlet 22 and pass through the rotor 14 and channels 15 for catalytic oxidation of the contaminants therein. The air then passes through transfer chamber 16. The heater device 18 may be simply used to supply the heat necessary for startup of the catalytic process, or it may be used on a continuous basis, thereby facilitating thermal oxidation within chamber 16. Alternately, fuel, for example natural gas, may be supplied to the transfer chamber 16, through the heater device 18. The purified gases are then directed back through channels within outlet compartment 24 and exhausted. As seen in FIG. 3, a fraction of the purified outlet stream or other clean air may be diverted back into the RCO through an optional purge compartment 26. Other purge methods, by vacuum for example, may also be incorporated.

As rotor 14 rotates, each of the channels 15 periodically passes through inlet compartment 22 through which process gases enter the RCO 10. If the purge option is desired, as the same channels continue to revolve, they next pass through purge compartment 26, wherein purified air forces any unreacted process gases into chamber 16. As shown in FIG. 3, purge compartment 26 is located between inlet and outlet compartments 22 and 24, respectively. When the channels 15 function as inlet channels, a spike of contaminated air may become trapped therein. The purge feature prevents the contaminated air from being released as the channels subsequently rotate into the output compartment and function as exhaust channels.

Upon further rotation, the channels 15 then pass through outlet compartment 24 from which purified air from transfer chamber 16 is exhausted. At the same time, the heat regenerative channels retain the heat thereby maximizing thermal efficiency and cooling of the discharged air. At any given moment, rotor 14 comprises a plurality of grouped channels that are segregated into either an inlet, purge, or outlet function. As shown in FIGS. 2 and 3, the function of a given channel will vary as it revolves through the different flow regimes defined by endplate 20.

Figure 4:
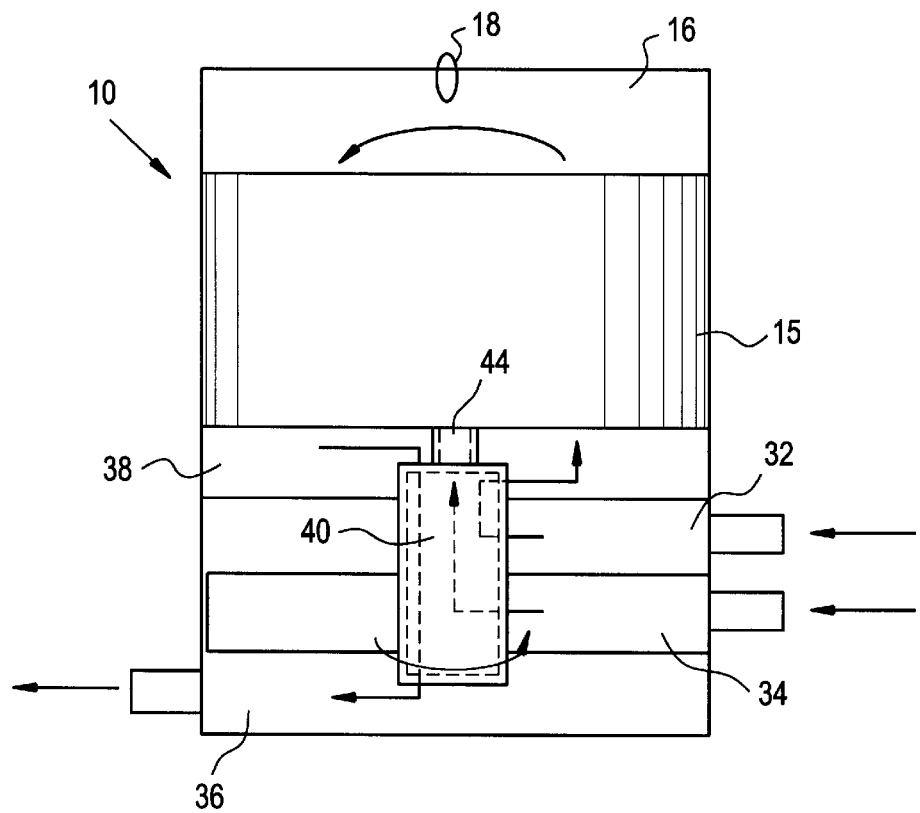
FIG. 4 schematically illustrates a second embodiment of the rotary regenerative catalytic oxidizer, having a rotary element and a stationary heat regenerative bed.
Figure 5:
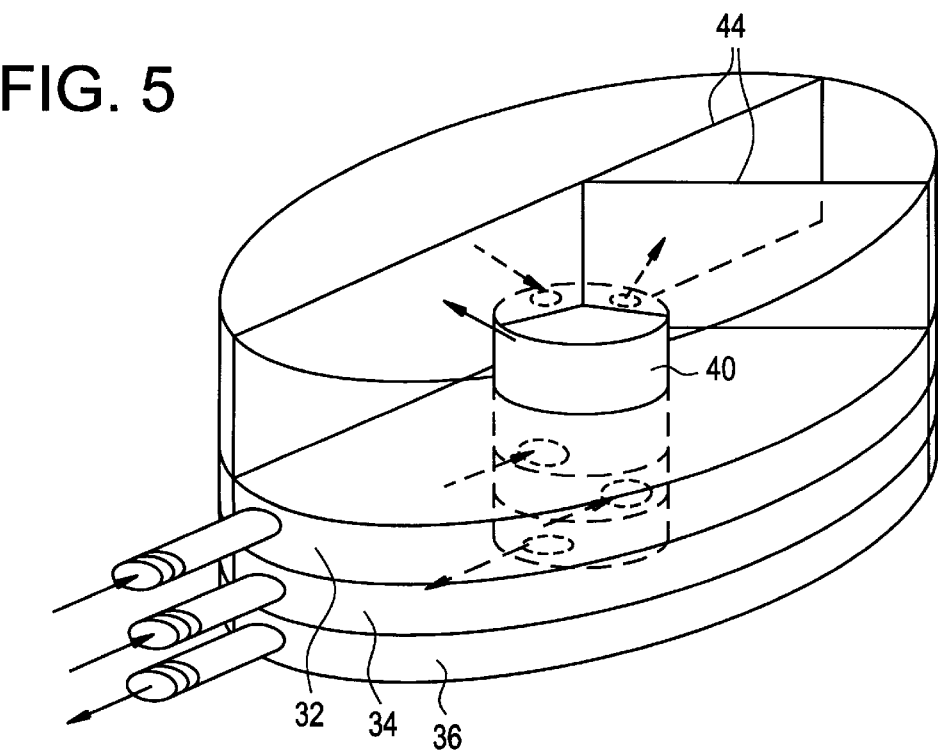
FIG. 5 schematically illustrates an expanded view of the rotary element of the second embodiment.

In accordance with the present invention, a second embodiment is shown in FIGS. 4 and 5. The second embodiment is better suited for handling large gas flows that require a large size of heat sink material. The heat exchange channels 15, having a first and a second end, are stationary. As in the first embodiment, a transfer chamber 16 is sealed and connected to housing 12 at a second end of rotor 14. A heater device 18 is disposed within chamber 16. The heater device 18 may comprise a burner, an electric heater, or other heat generating means and may be utilized either externally or internally of chamber 16. A plurality of layered sections are located at a first end of RCO 10. Section 32 comprises an input chamber, section 34 comprises an optional purge chamber, and section 36 comprises an output chamber. Section 38 comprises a dividing chamber that lies adjacent to, and in fluid communication with, the first ends of the channels 15. A one-piece rotating element 40, having a first and a second end, rotatably extends through the input, purge, output, and dividing chambers. Element 40 is internally divided into three separate passages, each passage forming a separate flow path and communicating with either the input, purge, or output chamber. Dividing plates 44, rotatably engaged within chamber 38, comprise the second end of element 40, and divide chamber 38 into alternating input, purge, and output zones. As shown in FIG. 5, element 40, comprising plates 44, rotates as a one-piece flow distributor, providing alternating gaseous flow to the several zones.

Dividing plates 44, radially spanning the RCO 10, are sealed against the first end of the channels 15, thereby creating input, purge, and output sections within the plurality of heat exchange channels. Plates 44 may be sealed either pneumatically, hydraulically, physically, or by other methods known in the art.

In operation, an input stream flows into chamber 32, through rotating element 40, into the inlet zone of chamber 38, and through the input section of heat exchange channels 15 for catalytic treatment. The gas then flows into transfer chamber 16 for further thermal oxidation if desired. The heater device 18 may be simply used to supply the heat necessary for startup of the catalytic process, or it may be used on a continuous basis, thereby facilitating thermal oxidation within chamber. The gases are forced through the transfer chamber 16 back through the outlet section of channels 15, thence through the outlet zone of chamber 38, through element 40, into chamber 36, and out of the RCO 10. A fraction of the output stream, or other air, may be directed into the purge stream flowing into chamber 34, through element 40, into the purge zone of chamber 38, through the purge section of channels 15, through the transfer chamber 16 and into the exhaust gas. Any other known purge method, by vacuum for example, may also be utilized. As the rotating element 40 and the dividing plates 44 continue to rotate, the stationary heat exchange channels 15 alternate in function, whereby one channel will serve an input, purge, and output function upon one complete rotation of the element 40. The load required to turn the rotating element 40, in contrast to turning the rotor 14 in the first embodiment, is substantially reduced.

Figure 7:
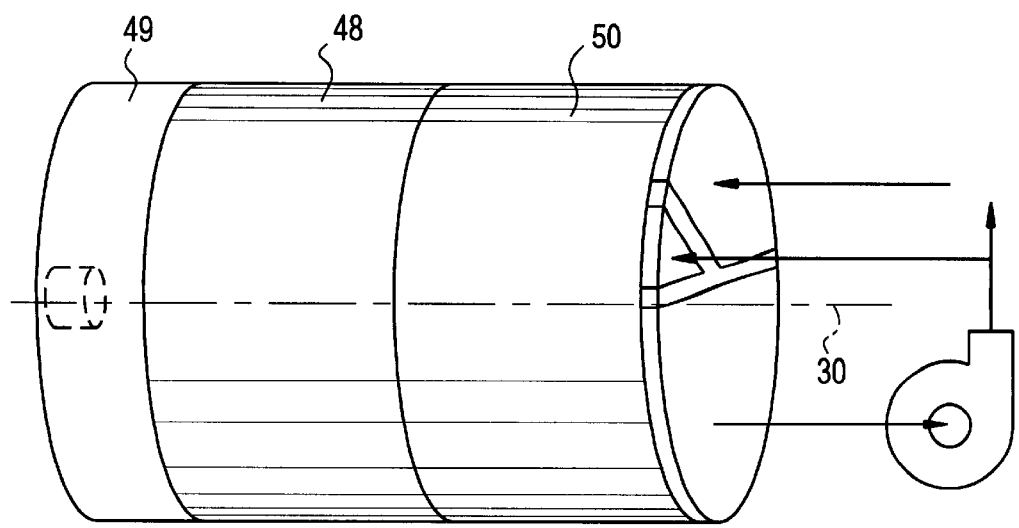
FIG. 7 illustrates a third embodiment of a rotary regenerative catalytic oxidizer having two in-line rotatable heat regenerative beds.
Figure 8:
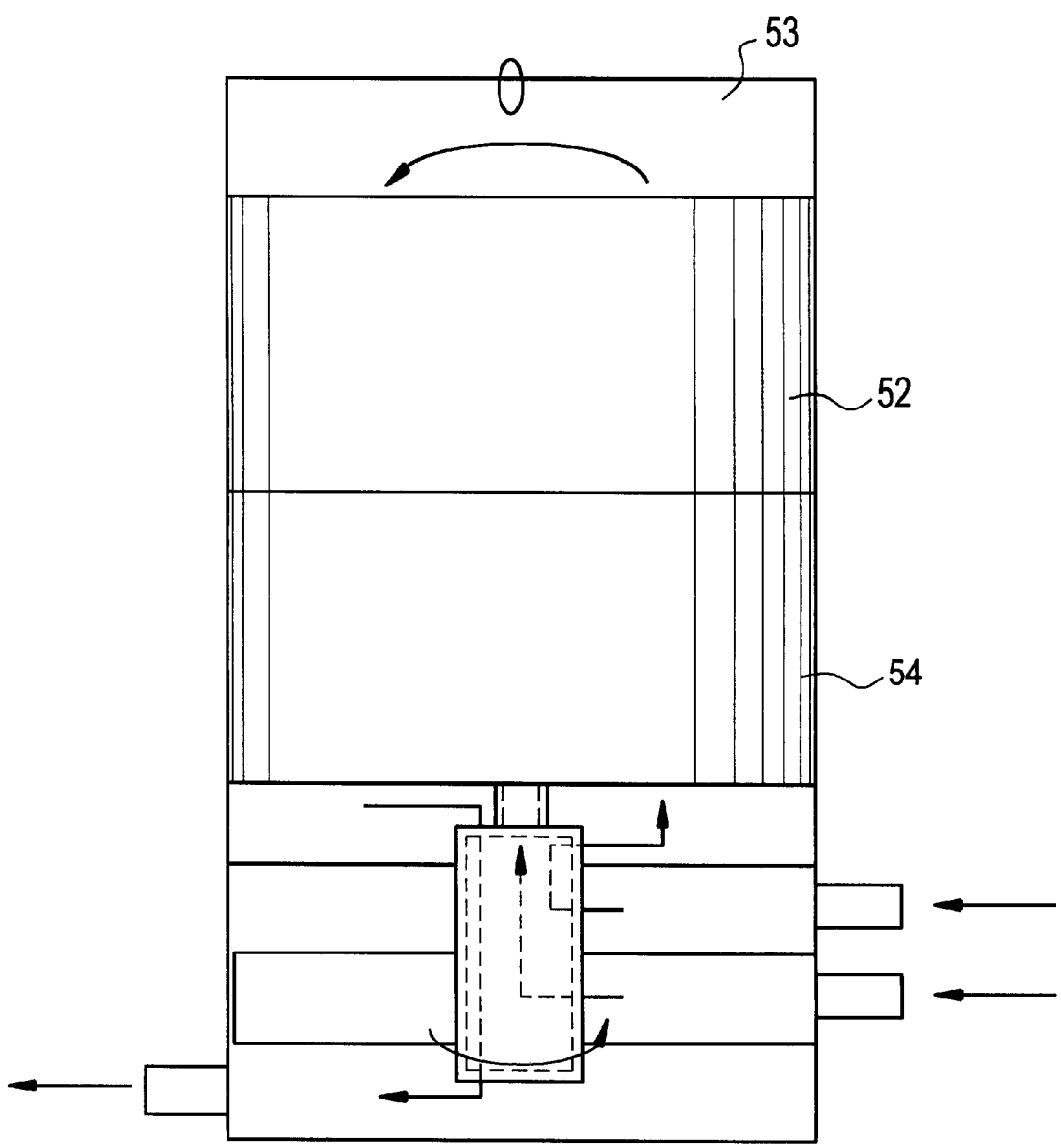
FIG. 8 illustrates a fourth embodiment of a rotary regenerative catalytic oxidizer, having a rotary element and two in-line stationary heat regenerative beds.

Generally, purge options are included for when the localized air contains high levels of VOC. In accordance with yet another aspect of the present invention, purification of high-VOC containing air may be enhanced by utilizing a combination of two or more in-line rotary heat exchange beds. The in-line rotors function essentially as that described in the first embodiment above. As shown in FIG. 7, the unit comprises a downstream and upstream rotor, 48 and 50 respectively, in close proximity to each other and rotating at the same speed. Alternatively, the upstream rotor may rotate and the downstream rotor may be fixed in place wherein the upstream rotor actually functions as an RCO and as a flow distributor for the downstream rotor. Furthermore, as shown in FIG. 8, a fourth embodiment may comprise two in-line stationary heat regenerative beds that incorporate a flow distributor as described in the second embodiment above. As shown in FIG. 8, the unit comprises a downstream and upstream heat regenerative bed, 52 and 54 respectively, in close proximity to each other.

In operation, and in accordance with FIGS. 7 and 8, the process gases first pass through the upstream rotor and are then directed through the downstream rotor. The upstream rotor 50 or 54, is preferably formed from heat exchange channels of relatively thick walls and low cell density, and has an approximate 40–50% void volume existing between the walls. The downstream rotor 48 or 52, is formed from heat exchange channels of relatively thin walls and high cell density, and has an approximate 60–80% void volume. The downstream rotor 48 or 52 is equipped with a transfer chamber 49 or 53, as in the first and second embodiments described above. The thick wall/low cell density rotor within the upstream rotor increases heat storage, reduces VOC carryover from the colder zone, and also reduces the pressure drop through the unit. After first being heated by the upstream rotor 50 or 54, the process gases increase in temperature and create a hotter temperature zone within the downstream rotor 48 or 52. Because of the higher temperature, a relatively higher cell density can be used within the downstream rotor 48 or 52 to increase gas/solid contact area, and thereby increase the destruction efficiency. Depending on design expedients, each of the in-line rotors may be comprised of honeycombed channels formed from different materials. For example, the upstream rotor may comprise a catalyzed or non-catalyzed honeycombed metallic or ceramic rotor, while the downstream rotor may comprise a fully or partially catalyzed honeycombed metallic or ceramic rotor. As would be appreciated by one skilled in the art, other combinations of catalyzed or uncatalyzed metallic and ceramic rotors may be used and such combinations are within the scope of this invention.

In certain applications, the non-catalyzed rotor may be comprised of materials that maintain their structurally integrity when exposed to the lower temperature ranges. For example, polymeric materials may be used over temperatures ranges from ambient temperature up to 300° F. in certain circumstances.

With regard to the first and third embodiments, the rotor 14 rotates at 0.5 to 10 revolutions per minute, depending on the thermal efficiency desired. For example, if high-VOC containing air is directed into the RCO 10, then the cycles per minute can be decreased to lower the thermal efficiency and operate under a self-sustaining mode. On the other hand, if low-VOC process gases are directed into the RCO 10, the cycles per minute can then be increased to raise the thermal efficiency and lower the energy consumption. The rotating element 40 of the second embodiment may be similarly adjusted to modify the thermal efficiency.

The RCO 10 is significantly smaller than an RCO of fixed-bed design, and yet has an equivalent thermal efficiency. Thermal efficiency, or A, can be expressed by the following formula:

$$\mu = (T_{max} - T_{out})/(T_{max} - T_{in})$$

where T represents temperature and $T_{max}$ will typically represent the oxidation temperature of the pollutant and $T_{in}$ and $T_{out}$ represent the inlet and outlet temperature of the air entering and leaving the apparatus, respectively.

Thermal efficiency depends on a number of complex factors. For a given gas flow, thermal efficiency increases with increasing heat transfer rate between gas and solids, increasing the solid thermal mass, and decreasing the cycle time. Mathematically, thermal efficiency can be expressed as a function of two parameters: reduced length and reduced period.

Figure 6:
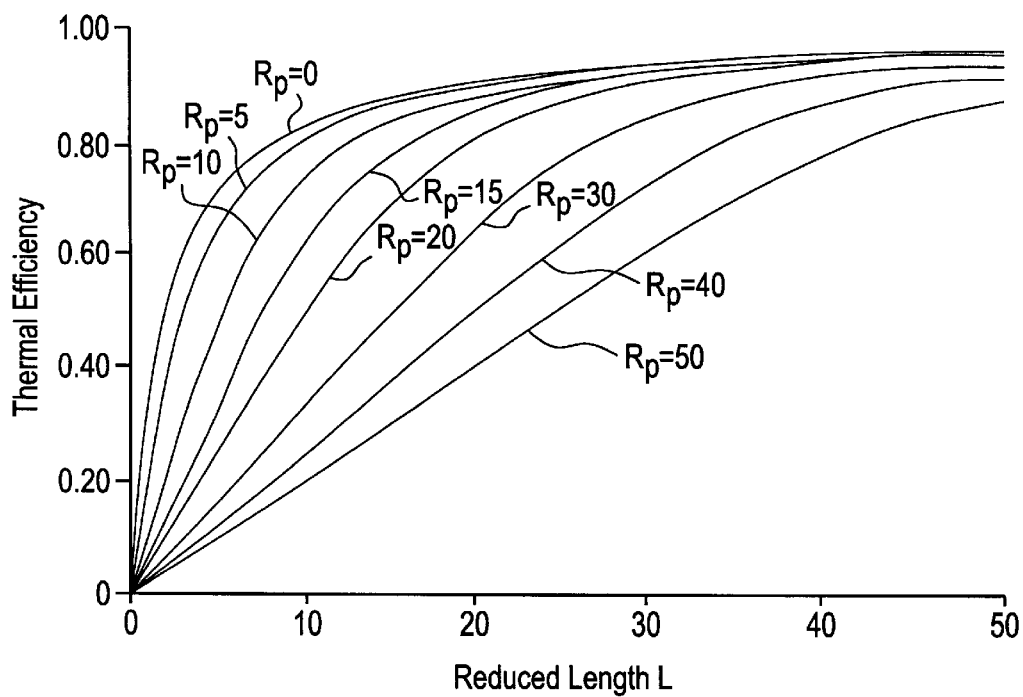
FIG. 6 is a graph illustrating the effect of reduced length and reduced period on thermal efficiency.

(1) thermal efficiency=f(reduced length, reduced period) where, (2) L=reduced length=hA/mfcf and, (3) Rp=reduced period=(hA/MsCs)*P As given in the equations, h is the heat transfer coefficient, A is the heat transfer area, and mf and cf are gas flow and gas specific heat, respectively. Ms and Cs are solid mass and solid specific heat, respectively. P is the period of a regenerator zone before switching. FIG. 6 illustrates the relationship of thermal efficiency with regard to reduced length, L, and reduced period, Rp.

The heat transfer area, A, can be varied by using different shapes and sizes of heat transfer material. A smaller size regenerator packed with high geometric area material and a large regenerator packed with a lower geometric area material may have the same heat transfer zone, or reduced length. Nevertheless, the thermal efficiency of the smaller regenerator would be less than that of the large regenerator if the cycle period was the same for both. The smaller thermal mass of the small regenerator results in a larger number of the reduced period. As shown in FIG. 6, the thermal efficiency decreases as the reduced period is increased and as the reduced length is decreased.

In accordance with the present invention, continuous rotation of the rotor facilitates steady state treatment of the air. The thermal efficiency can be decreased from 92% to 87% simply by reducing the rotational speed from 10 rpm to 1 rpm. The simple method of adjusting thermal efficiency represents a significant improvement when treating air that contains varied pollutant loadings. As the pollutant loading becomes relatively high, the thermal efficiency must be lowered to maintain a thermal balance. Certain known rotary designs incorporate a rotational feature that indexes the rotor. Continuous rotation, in contrast to indexing, permits simplified tailoring of the cycle period and thus, a corresponding decrease or an increase in the thermal efficiency if desired.

In accordance with applications of the present invention involving flow rates of 5 to 200 SCFM, the rotary heat exchange designs of the present invention have low pressure drops, typically less than 1" of water column. Possible applications include purification methods involving groundwater treatment, indoor air clean up, and treatment of fugitive emissions.

The rotary RCO is generally operated in flow rates normally found with recuperative heat exchangers. In contrast to a recuperative heat exchanger, a rotary regenerative heat exchanger provides a more uniform axial temperature, and therefore more uniform surface temperatures. As such, recuperative heat exchanger concerns such as corrosion caused by "cold spots", condensation, and poor thermal efficiency are eliminated.

Unlike many rotary treatment systems of the related art, the preferred embodiment of the present invention combines the thermal and catalytic components into one bed. In contrast to gaseous flow perpendicular to the axis of rotation, the input and output flow efficiency is enhanced by directing the flow through axially parallel channels. Furthermore, the only independent sealing means required is the sealing plate 44 located at the "cold" or input/output end of the system. The inherent seals of the heat exchange channels ensures simplified flow separation. In contrast, related art systems require sealing mechanisms that must be heat resilient due to the elevated heat exposure of their particular designs. This complicates the system, and increases manufacturing costs.

Yet another benefit is that the various embodiments function with a reduction in parts normally found in known oxidizers. For example, many known rotary valve regenerative oxidizers use metallic partitions contained within the heat exchange beds. This design results in maintenance concerns due to leakage and stress cracks, and is more costly to construct. No metallic partitions are utilized in the present invention and as such, leakage is reduced, manufacturing costs are minimized, and treatment efficiency is enhanced. Other known designs incorporate multi-component flow distributors. In accordance with the present invention, the rotary distributor comprises a unified or one-piece structure, thereby eliminating the multiple parts found in known distributors, and reducing manufacturing costs.

EXAMPLES

The following examples demonstrate several principles of the invention.

Example 1

Figure 9:
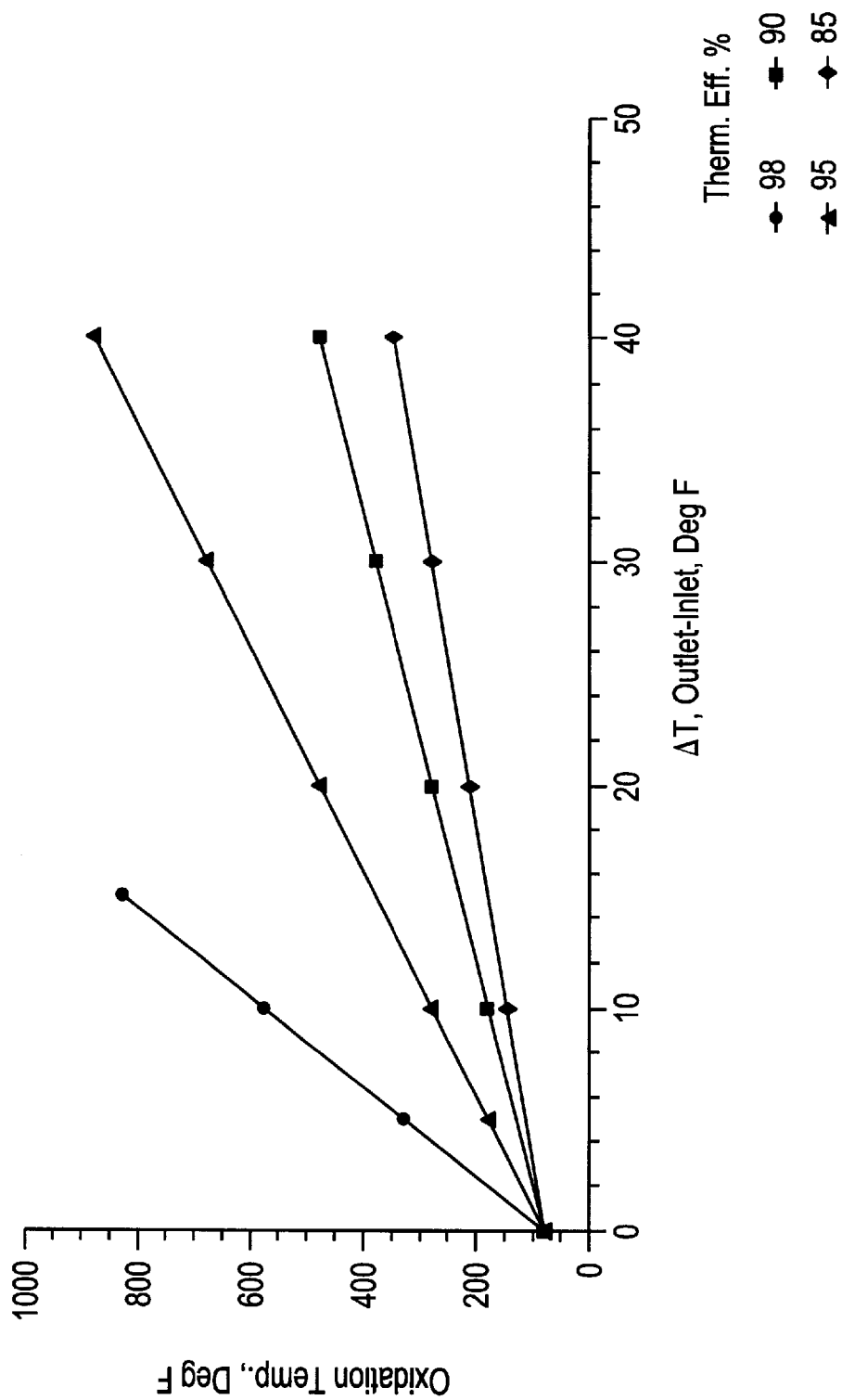
FIG. 9 illustrates the relationship of oxidation temperature versus treated air outlet-inlet temperature differential for various thermal efficiencies.

This example demonstrates the criticality of requiring a high thermally efficient device in order to have the treated air discharged at a comfortable temperature. FIG. 9 shows the relationship of oxidation temperature versus the temperature difference between treated air temperature and incoming air at different thermal efficiencies. For a given outlet temperature, the oxidation temperature increases with increasing thermal efficiency based on the following equation:

$$\text{Thermal Efficiency} = (T_{oxd} - T_{out})/(T_{oxd} - T_{in})$$

Typically, to be catalytically effective, the oxidation temperature needs to be greater than 300° F. for removing remove odor. FIG. 9 shows that by using a catalytic design of greater than 90 percent thermal efficiency, the oxidation temperature can be operated at these temperatures while the outlet temperature is to be within 30° F. higher of the inlet temperature. With such a high thermal efficiency, this device is in essence effectively removing the odor with a temperature of only 30° F. greater than the room temperature, very close to an ambient catalytic device. The treated air can be comfortably discharged into a room and no additional ducts are necessary to vent the treated air outdoors. Therefore, a higher thermally efficient device would further reduce the discharge temperature of the air returning into the room.

Example 2

Figure 10:
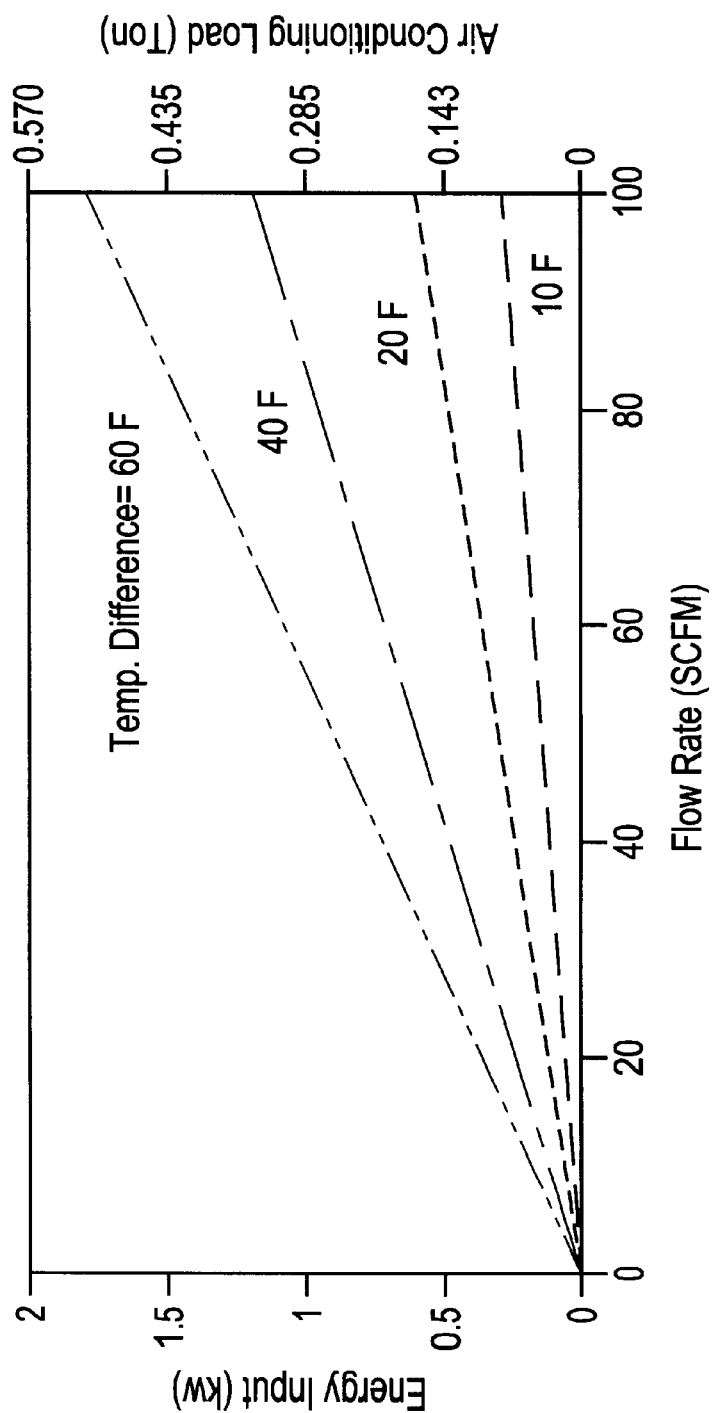
FIG. 10 illustrates the relationship of power requirement as a function of air flow rate and treated air outlet-inlet temperature differential.

This example demonstrates design criteria critical to having the apparatus of the present invention able to operate from household current. FIG. 10 shows the power requirement versus air flow rate as a function of temperature difference between treated air and the room air. By controlling the temperature difference to be less than 30° F., an air volume of less than 100 SCFM can be processed with a power requirement of less than 1000 watt. This power requirement can be supplied by most household current. As shown in FIG. 9, increasing thermal efficiency reduces the temperature difference. Thus, higher thermal efficiency will result in lower power requirement and accompanying lower discharge temperature of the air returning to a room.

Example 3

The example demonstrates that a relatively small wheel volume is required to treat streams having flows of 100 SCFM (which is equivalent to turning over the air in a 12'×12'×8' space 12 times per hour). FIG. 11 shows the effect of the wheel volume versus the thermal efficiency. Since the thermal efficiency also depends on the flow rate, the thermal efficiency can be calculated as a function of space velocity (SV) which is defined as the ratio of gas flow rate to the wheel volume. FIG. 11 shows for a 400 CPSI, 2 mil metal wheel, 90 percent thermal efficiency can be obtained at 25,000 1/hr SV. For a higher thermal efficiency, the wheel size will need to increase (or the SV will need to be lower). FIG. 11 shows that for 95 percent thermal efficiency, the space velocity will need to be reduced to 12,500 1/hr. If the wheel is to handle 100 SCFM, a wheel size of only 0.5 ft³ is needed to achieve 95 percent thermal efficiency.

Example 4

This example shows the advantage that catalyzing a honeycomb wheel has on thermal efficiency. By fully catalyzing the wheel honeycomb with Pt/alumina, FIG. 12 shows that VOC such as toluene can be oxidized at temperatures as low as 350° F. at 15,000 1/hr SV. This shows that by control the oxidation temperature at 700° F. for a rotary regenerator, about half of the wheel temperature is higher than 350° F. Thus, if this portion of the wheel is to operate at 15,000 1/hr SV, greater than 95 percent of the VOC will be destroyed. Using this volume as the base, the overall wheel for heat exchange will be operated at 7500 1/hr SV. FIG. 11 shows that at this space velocity, the thermal efficiency is 97 percent. FIG. 9 shows that the treated air temperature is only 15° F. higher than room air.

Example 5

This example demonstrates the criticality of using a partially coated wheel in order to achieve the highest destruction efficiencies when using catalysts supported on alumina. It has been found that the alumina washcoat used to disperse active precious metal in most VOC catalysts has an adverse effect on RRCO's VOC removal efficiency. As the VOC laden gas stream enters the inlet section of the wheel where catalyst temperature is not high enough to start oxidation reaction, hydrocarbon is adsorbed on the alumina surface of the catalyst. When the wheel rotates to the other side of the unit, the clean outlet gas stream desorbs these unreacted hydrocarbons from the catalyst surface causing them to enter back to the gas stream. This leads to higher VOC concentration at outlet and lowers the overall VOC destruction efficiency of the unit. To improve the RRCO's VOC destruction efficiency, the catalyzed substrate in the low temperature zone has to be replaced with a blank substrate or not be initially coated with catalyst where adsorption instead of oxidation is the dominant rate process. This is demonstrated by the test data shown in Table I. For both metal and ceramic substrates, the toluene conversion (representative of typical VOC) is significantly improved by replacing more than 40 percent of the wheel with blank substrate. Also shown in this table is the CO conversion data. Because CO adsorption on the catalyst is weak, CO conversion is thus not affected by those changes. Thus, in order to achieve the highest destruction efficiencies in some applications, consideration should be given in using a partially-catalyzed wheel.

TABLE I

| Type of Wheel | Space Velocity (1/hr) | Fraction of Blank Substrate (%) | Control Chamber Temp. (F.) | Inlet Temp. (F.) | Toluene Conv. (%) | CO Conv. (%) | Thermal Efficiency (%) |
| --- | --- | --- | --- | --- | --- | --- | --- |
| 400 cpsi Metal Wheel | 14700 | 0 | 1000 | 80 | 49.2 | 100 | 91.1 |
| 400 cpsi Metal Wheel | 14700 | 46 | 1000 | 81 | 96.4 | 100 | 93.3 |
| 400 cpsi Ceramic Wheel | 14700 | 14 | 1100 | 81 | 75.6 | 100 | 92.1 |
| 400 cpsi Ceramic Wheel | 14700 | 43 | 1100 | 81 | 97.2 | 100 | 91.4 |
| 400 cpsi Ceramic Wheel | 14700 | 46 | 900 | 81 | 95.7 | 100 | 93.9 |

While the preferred embodiments of the invention have been disclosed, it should be appreciated that the invention is susceptible of modification without departing from the scope of the following claims. Thus, one skilled in the art would appreciate that other rotary oxidative devices may be used in conjunction with this invention such as those disclosed in U.S. Pat. No. 5,362,449; international patent application PCT/FR95/ 01692; and European patent application publication EP 684,427 the disclosures of which are incorporated by reference.

What is claimed is:

1. A portable pollutant abatement apparatus for removal of pollutants and odorous compounds such as volatile organic compounds from ambient air present in a localized environment comprising:

one inlet for recovering the ambient air and directing a flow of the air through a partially or fully catalyzed rotary, heat regenerative device, said flow through the rotary device being perpendicular or axial with reference to the axis of rotation of the rotary device;

the rotary device comprising electrical heating means and means to recover heat from the air after catalytic oxidation and before the oxidized air is returned to the ambient air; and one outlet for directing the oxidized air from the rotary device to the ambient air.

2. The apparatus of claim 1 further comprising a fan to direct the air.

3. The apparatus of claim 2, wherein the fan is located at the inlet to the rotary device.

4. The apparatus of claim 1, wherein the rotary device comprises:

one or more rotors, wherein a first rotor comprises a plurality of discrete heat exchange surfaces arranged in an axially parallel and longitudinal array, said rotor having a first and a second end, wherein the surfaces form a plurality of heat exchange channels;

a transfer chamber connected to the second end of the rotor;

a sealing endplate adjoining the first end of the rotor, wherein the endplate divides the rotor into inlet and outlet compartments; and an adjustable means for rotating the rotor about a longitudinal axis.

5. The apparatus of claim 4, further comprising a means for purging unreacted air from the first rotor.

6. The apparatus of claim 4, wherein the transfer chamber comprises a heat generating means for heating the air to a predetermined abatement temperature.

7. The apparatus of claim 4, wherein the surfaces are catalytically coated no more than 75 percent.

8. The apparatus of claim 6, wherein the surfaces are catalytically coated no more than 50 percent.

9. The apparatus of claim 4, wherein the first rotor has a cell density of at least 25 cells per square inch.

10. The apparatus of claim 9, wherein the surfaces are formed in a honeycomb monolith comprising a metallic or ceramic substrate.

11. The apparatus of claim 4, further comprising a stationary or rotating second rotor, positioned between said first rotor and said transfer chamber, wherein said second rotor is partially or fully catalyzed and comprises a plurality of heat exchange surfaces arranged in an axially parallel and longitudinal array, said surfaces forming a plurality of heat exchange channels in fluid communication with said first rotor and said transfer chamber, said second rotor having a cell density greater than that of said first rotor.

12. A portable pollutant abatement apparatus for removal of pollutants such as volatile organic compounds and odorous compounds from ambient air present in a localized environment comprising:

a first partially or fully catalyzed heat exchange bed comprising a plurality of heat exchange surfaces, arranged in an axially parallel and longitudinal array, each of said surfaces having a first and second end, wherein said surfaces form a plurality of heat exchange channels;

a transfer chamber communicating with the second end of said surfaces;

a second partially or fully catalyzed heat exchange bed, positioned between said first heat exchange bed and said transfer chamber, said second heat exchange bed comprising a plurality of heat exchange surfaces arranged in an axially parallel and longitudinal array, wherein said surfaces form a plurality of heat exchange channels in fluid communication with said first heat exchange bed and said transfer chamber, said second bed having a cell density greater than that of said first heat exchange bed;

a sealing endplate adjoining the first end of said surfaces, wherein said endplate divides said channels into inlet and outlet zones;

a distribution plenum, fluidly communicating with said distribution plenum;

one gas inlet plenum, fluidly communicating with said distribution plenum;

one gas outlet plenum, fluidly communicating with said distribution plenum; and a one-piece, rotatable, flow distributor, wherein said distributor fluidly communicates with said distribution, inlet and outlet plenums.

* * * * *